United States Patent [19]

Zeyer et al.

[11] Patent Number: 6,127,635
[45] Date of Patent: Oct. 3, 2000

[54] COMBINATIONAL WEIGHING DEVICE

[75] Inventors: Bernd Zeyer, Engelsberg, Germany; Tony Pain, Beaconsfield, United Kingdom

[73] Assignee: Multipond Wagetechnik GmbH, Waldkraiburg, Germany

[21] Appl. No.: 09/270,541

[22] Filed: Mar. 17, 1999

[30] Foreign Application Priority Data

Mar. 18, 1998 [DE] Germany .................. 198 11 837

[51] Int. Cl.⁷ ..................... G01G 19/32; G01G 13/00
[52] U.S. Cl. ........................ 177/25.18; 177/103
[58] Field of Search ................ 177/25.18, 103, 177/104, 114, 115, 116

[56] References Cited

U.S. PATENT DOCUMENTS

| | | | |
|---|---|---|---|
| 3,939,928 | 2/1976 | Murakami et al. | 177/25 |
| 4,627,012 | 12/1986 | Yamada | 177/25.18 |
| 4,658,919 | 4/1987 | Nobutsugu | 177/25.18 |
| 4,853,881 | 8/1989 | Yamada | 177/25.18 |

FOREIGN PATENT DOCUMENTS 0 282 225 B1  6/1992  European Pat. Off. .

*Primary Examiner*—Randy W. Gibson
*Attorney, Agent, or Firm*—George W. Neuner; Dike, Bronstein, Roberts & Cushman LLP

[57] ABSTRACT

A combinational weighing device comprises a plurality of weighing cells and corresponding associated weighing hoppers ($W_1 \ldots W_{10}$) and an outlet-side transfer device (5) for supplying weighed products into a package to be arranged therebelow. In conventional manner a controller (6) has an input connected with the output of the load cells and an output connected to respective drives for the closable outlets of the weighing hoppers. The drives of the outlets of the weighing hoppers are controlled in such a manner that a corresponding subcombination of several weighing hoppers is selected for forming a total amount to be supplied into a package. In order to increase the speed in cases where the individual weights of the articles differ by a sufficiently small amount the controller is designed to be switched to a second operational mode wherein the controller drives the outlets of the weighing hoppers so that each weighing hopper can be selected independently of the other weighing hoppers. This considerably increases the weighing speed.

2 Claims, 2 Drawing Sheets

10 Head Combinational Weighing Device

Triple Linear Weighing Device

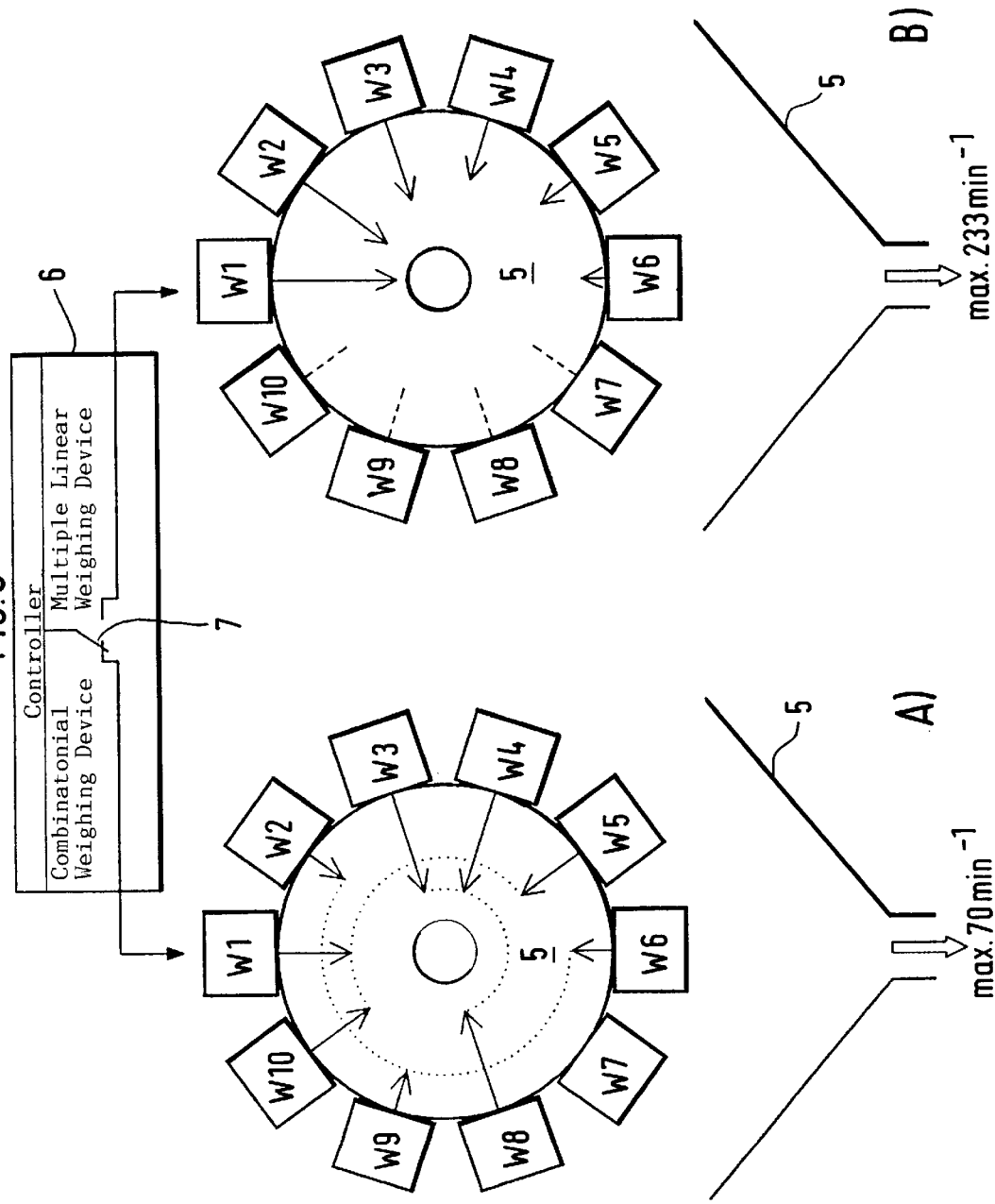

COMBINATIONAL WEIGHING DEVICE

The invention relates to a combinational weighing device.

A combinational weighing device of this kind is disclosed in DE 23 40 832 C. In such a combinational weighing device sub-amounts are produced in the individual weighing hoppers and a total amount is formed by selecting a sub-combination out of the total number of weighing heads and supplied to a package. Such a combinational weighing device comprises a plurality, preferably 10 or 14, respectively, of load cells and associated weighing hoppers for selecting the subcombination therefrom. It is the advantage of this type of weighing device that uniform total weights can be obtained even if the weights of single pieces of the article vary and nevertheless a relatively high weighing speed of about 70 weighing operations per minute can be achieved with a weighing device having 10 weighing heads.

Moreover, conventional automatic weighing devices are known for weighing a respective product at a time and feeding it into a package. In order to increase the weighing speed a number of such independently operating weighing devices are arranged side by side. Three weighing devices of this type are necessary to attain the weighing speed of a 10 head combinational weighing device. Since each automatic weighing device supplies the products individually the speed per weighing device can be higher than in the case of combinational weighing devices. However, the uniformity of the product weights is lower. Thus, both types of weighing devices are used as required.

FIG. 1 shows a linear weighing device comprising three product feeders 1 arranged side by side and corresponding weighing hoppers $W_1$ to $W_3$ at their respective outlets, and a common controller 3. A conical chute 4 is provided at the outlet side of the weighing hoppers for supplying the products, after their weight has been determined, from the weighing hoppers successively, one after the other, to a package disposed below the chute.

The upper portion of FIG. 2 shows a top view of a combinational weighing device comprising weighing hoppers $W_1$ to $W_{10}$ with their corresponding outlets cooperating with the conical chute 5 indicated therebelow. The outlets of the weighing hoppers $W_1$ to $W_{10}$ are controlled by a (not shown) controller in such a manner that corresponding subcombinations of three weighing hoppers out of the ten weighing hoppers are simultaneously opened for producing the total amount, the subcombination of the three weighing hoppers being indicated in the Figure by arrows of equal length. It can be seen that in the embodiment shown combinations of the weighing hoppers $W_3$, $W_4$, $W_8$; $W_1$, $W_5$, $W_{10}$; $W_2$, $W_6$, $W_9$ are formed in three subsequent supply cycles.

It is the object of the invention to increase the weighing speed as a function of the desired weighing result.

This object is achieved by the combinational weighing device as defined in claim 1.

Further features and advantages of the invention will be apparent from the description of an embodiment with reference to the Figures. In the Figures:

FIG. 3 is a schematic representation of a combinational weighing device according to the invention.

Figure 2:
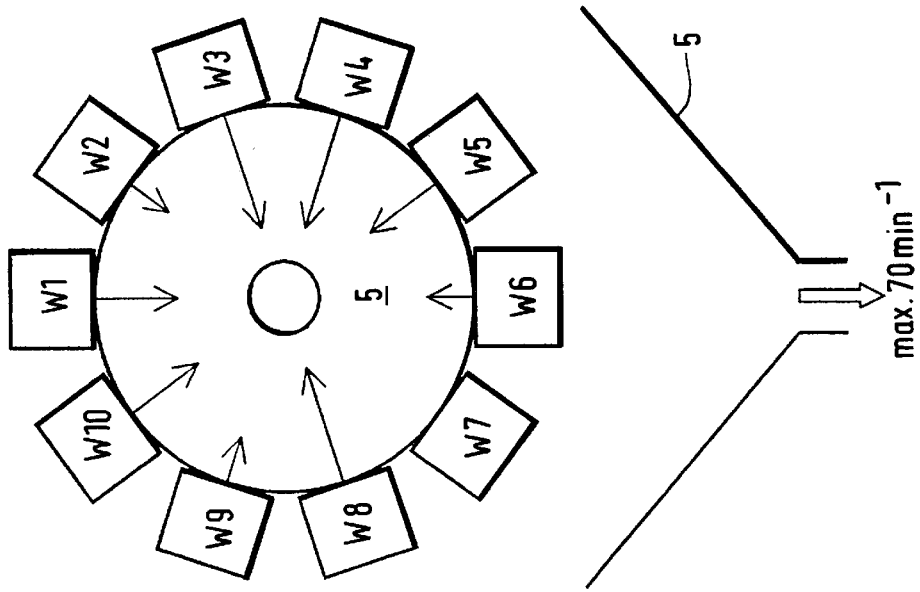
FIG. 2 is a schematic representation of a combinational weighing device.
Figure 1:
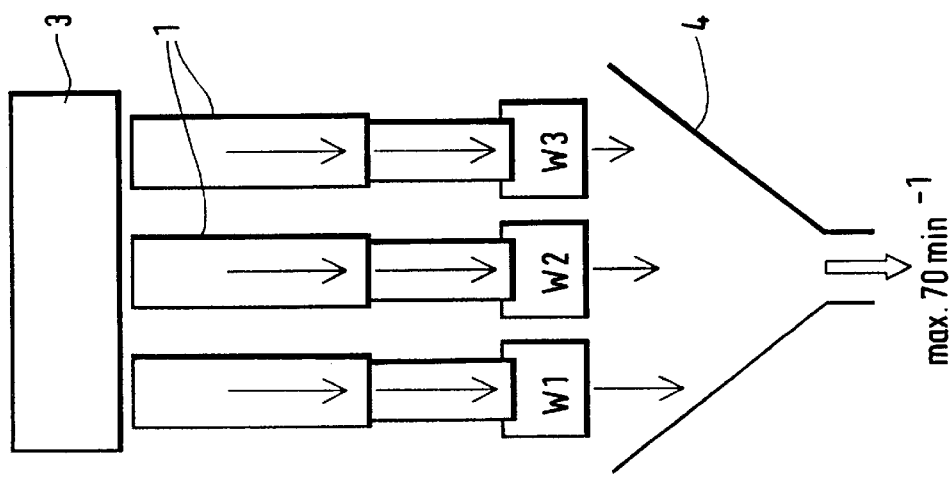
FIG. 1 is a schematic representation of a known linear weighing device.

In FIG. 3 two operational modes of the inventive combinational weighing device are shown. The combinational weighing device comprises weighing hoppers $W_1$ to $W_{10}$. A respective (not shown) load cell is associated to each weighing hopper and an output signal of each load cell is passed to a controller 6. The output of the controller 6 is connected to respective drives of hinged output doors of the weighing hoppers $W_1$ to $W_{10}$. The outlets are oriented towards a common conical chute 5, the packages to be filled being arranged below the chute in operation.

In operation the controller operates in the manner already described with reference to FIG. 3. Specifically, respective subcombinations of partial weights are selected for forming a total weight. In the embodiment a) the amounts contained in weighing hoppers $W_3$, $W_4$, $W_8$; $W_1$, $W_5$, $W_{10}$; $W_2$, $W_6$, $W_9$ form respective subcombinations for forming a total weight.

The controller 6 is designed to be switched, by means of a reversing switch 7, from the combinational weighing mode described above into a linear weighing mode. In this linear weighing mode the controller operates the drive for the outlet doors of the weighing hoppers, as indicated by the arrows in FIG. 3b), to open the outlet doors of the individual weighing hoppers independently and one after the other for delivering a weighed amount of product to the chute 5. In the embodiment shown the outlets of the weighing hoppers $W_1$, $W_2$, $W_3$ ... to $W_{10}$ are opened one after the other so that the individual weighing hoppers, together with the associated load cells, are operated linearly, independently and simultaneously, whereby the weighing device acts like a number of ten linear weighing devices. It is achieved in this manner that, on the one hand, the combinational weighing device produces very exact amounts of product even if there are major variations of the individual articles and/or major fluctuations of the delivered total weight of the portions can be accepted, and, on the other hand, after simply changing the weighing mode, the weighing speed can be considerably increased, if the weights of the individual articles are sufficiently close to each other.

What is claimed is:

1. Combinational weighing device comprising a plurality of load cells with corresponding associated weighing hoppers $W_1$ ... $W_{10}$) each having a closable outlet, an outlet-side transfer device (5) for supplying weighed products into packages to be arranged therebelow, and a controller (6) having an input connected to the output sides of the load cells and an output connected to respective drives for operating the closable outlets of the weighing hoppers, the controller controlling the outlets of the weighing hoppers such that a respective subcombination of several weighing hoppers is selected to form a total amount to be supplied to a package, characterized in that the controller is switchable to a second operational mode wherein it drives the outlets of the weighing hoppers such that each weighing hopper is selected independently of the other weighing hoppers.

2. A combinational weighing device according to claim 1, characterized in that the outlets of the weighing hoppers are driven in a sequence corresponding to the arrangement of the weighing hoppers.

* * * * *